US012282242B2

(12) United States Patent
Christen et al.

(10) Patent No.: US 12,282,242 B2
(45) Date of Patent: Apr. 22, 2025

(54) SYSTEM AND METHOD FOR MULTIPLEXED OPTICAL ADDRESSING OF ATOMIC MEMORIES

(71) Applicants: President and Fellows of Harvard College, Cambridge, MA (US); Massachusetts Institute of Technology, Cambridge, MA (US)

(72) Inventors: Ian Robert Christen, Cambridge, MA (US); Dirk R. Englund, Brookline, MA (US); Hannes Bernien, Somerville, MA (US); Ahmed Omran, Somerville, MA (US); Alexander Keesling Contreras, Boston, MA (US); Harry Jay Levine, Cambridge, MA (US); Mikhail D. Lukin, Cambridge, MA (US)

(73) Assignee: President and Fellows of Harvard College and Massachusetts Institute of Technology, Cambridge, MA (US)

( * ) Notice: Subject to any disclaimer, the term of this patent is extended or adjusted under 35 U.S.C. 154(b) by 454 days.

(21) Appl. No.: 17/611,679

(22) PCT Filed: May 15, 2020

(86) PCT No.: PCT/US2020/033100
§ 371 (c)(1),
(2) Date: Nov. 16, 2021

(87) PCT Pub. No.: WO2020/236574
PCT Pub. Date: Nov. 26, 2020

(65) Prior Publication Data
US 2022/0197102 A1   Jun. 23, 2022

Related U.S. Application Data

(60) Provisional application No. 62/849,278, filed on May 17, 2019.

(51) Int. Cl.
*G02F 1/21* (2006.01)
*G06N 10/40* (2022.01)
(Continued)

(52) U.S. Cl.
CPC .............. *G02F 1/212* (2021.01); *G06N 10/40* (2022.01); *H04B 10/614* (2013.01); *H04B 10/70* (2013.01)

(58) Field of Classification Search
CPC ........... G02F 1/00; G02F 1/212; G06N 10/00; G06N 10/40; H04B 10/614; H04B 10/70
See application file for complete search history.

(56) References Cited

U.S. PATENT DOCUMENTS

| 3,872,470 A | 3/1975 | Hoerz et al. |
| 4,479,199 A | 10/1984 | Friedlander et al. |

(Continued)

FOREIGN PATENT DOCUMENTS

| CN | 106980178 A | 7/2017 |
| EP | 1171968 B1 | 11/2002 |

(Continued)

OTHER PUBLICATIONS

Aliferis et al., "Computation by measurements: A unifying picture," Arxiv: 13 pages (2004).

(Continued)

*Primary Examiner* — Daniel Petkovsek
(74) *Attorney, Agent, or Firm* — Alexander Akhiezer; Erik Huestis; Foley Hoag LLP

(57) ABSTRACT

A system for optically modulating a plurality of optical channels includes a power delivery module adapted to convert a coherent light beam into a plurality of optical channels, at least one optical modulator, optically coupled to the power delivery module, the at least one optical modulator adapted to optically modulate each of the plurality of (Continued)

the optical channels, and a vacuum chamber having a trapping plane therein, the vacuum chamber adapted to generate an addressable array of trapped particles at the trapping plane, wherein each of the plurality of optical channels is optically coupled to at least one of the trapped particles of the addressable array.

19 Claims, 10 Drawing Sheets

(51) Int. Cl.
*H04B 10/61* (2013.01)
*H04B 10/70* (2013.01)

(56) References Cited

U.S. PATENT DOCUMENTS

| | | | |
|---|---|---|---|
| 5,684,621 | A | 11/1997 | Downing |
| 6,988,058 | B1 | 1/2006 | Sherwin et al. |
| 10,962,810 | B2 * | 3/2021 | Ma .................... G02F 1/025 |
| 11,380,455 | B2 * | 7/2022 | Keesling Contreras .. G02F 1/33 |
| 11,710,579 | B2 | 7/2023 | Keesling Contreras et al. |
| 11,985,451 | B2 | 5/2024 | Kim et al. |
| 12,051,520 | B2 | 7/2024 | Keesling Contreras et al. |
| 2002/0089718 | A1 | 7/2002 | Penninckx et al. |
| 2004/0000666 | A1 | 1/2004 | Lidar et al. |
| 2004/0017833 | A1 | 1/2004 | Cundiff et al. |
| 2004/0126114 | A1 | 7/2004 | Liu et al. |
| 2006/0225165 | A1 | 10/2006 | Maassen van den Brink et al. |
| 2007/0113012 | A1 | 5/2007 | Cable et al. |
| 2008/0116449 | A1 | 5/2008 | Macready et al. |
| 2008/0185576 | A1 | 8/2008 | Hollenberg et al. |
| 2008/0237579 | A1 | 10/2008 | Barker et al. |
| 2008/0313430 | A1 | 12/2008 | Bunyk |
| 2009/0204877 | A1 | 8/2009 | Betts |
| 2009/0299947 | A1 | 12/2009 | Amin et al. |
| 2011/0238607 | A1 | 9/2011 | Coury et al. |
| 2014/0025926 | A1 | 1/2014 | Yao et al. |
| 2014/0200689 | A1 | 7/2014 | Utsunomiya et al. |
| 2014/0253987 | A1 | 9/2014 | Christmas |
| 2015/0317558 | A1 | 11/2015 | Adachi et al. |
| 2016/0064108 | A1 | 3/2016 | Saffman et al. |
| 2016/0125311 | A1 | 5/2016 | Fuechsle et al. |
| 2016/0328253 | A1 | 11/2016 | Majumdar |
| 2017/0300817 | A1 | 10/2017 | King et al. |
| 2018/0217629 | A1 | 8/2018 | Macfaden |
| 2018/0218279 | A1 | 8/2018 | Lechner et al. |
| 2018/0260731 | A1 | 9/2018 | Zeng et al. |
| 2019/0266508 | A1 | 8/2019 | Bunyk et al. |
| 2020/0185120 | A1 | 6/2020 | Keesling Contreras et al. |
| 2021/0279631 | A1 | 9/2021 | Pichler et al. |
| 2021/0365827 | A1 | 11/2021 | Monroe et al. |
| 2021/0383189 | A1 | 12/2021 | Cong et al. |
| 2022/0060668 | A1 | 2/2022 | Kim et al. |
| 2022/0138608 | A1 | 5/2022 | Ramette et al. |
| 2022/0197102 | A1 | 6/2022 | Christen et al. |
| 2022/0293293 | A1 | 9/2022 | Contreras et al. |
| 2022/0391743 | A1 | 12/2022 | Wild et al. |
| 2023/0326623 | A1 | 10/2023 | Keesling Contreras et al. |
| 2023/0400492 | A1 | 12/2023 | Xu et al. |
| 2024/0029911 | A1 | 1/2024 | Lukin et al. |
| 2024/0185113 | A1 | 6/2024 | Cong et al. |
| 2024/0289665 | A1 | 8/2024 | Pichler et al. |
| 2024/0346352 | A1 | 10/2024 | Bluvstein et al. |
| 2024/0347995 | A1 | 10/2024 | Levine et al. |

FOREIGN PATENT DOCUMENTS

| | | |
|---|---|---|
| EP | 3113084 A1 | 1/2017 |
| EP | 3438726 A1 | 2/2019 |
| GB | 0205011 A | 10/1923 |
| JP | 2004/045453 A | 2/2004 |
| JP | 2007/233041 A | 9/2007 |
| JP | 2008/134450 A | 6/2008 |
| JP | 2008/158325 A | 7/2008 |
| JP | 2014-197733 A | 10/2014 |
| JP | 2017/078832 A | 4/2017 |
| WO | WO-2014/051886 A1 | 4/2014 |
| WO | WO-2019/014589 A1 | 1/2019 |
| WO | WO-2020/072981 A1 | 4/2020 |
| WO | WO-2020/172588 A1 | 8/2020 |
| WO | WO-2020/236574 A1 | 11/2020 |
| WO | WO-2021/007560 A1 | 1/2021 |
| WO | WO-2021/141918 A1 | 7/2021 |
| WO | WO-2022/132388 A2 | 6/2022 |
| WO | WO-2022/132389 A2 | 6/2022 |
| WO | WO-2022/174072 A1 | 8/2022 |
| WO | WO-2022/132388 A3 | 9/2022 |
| WO | WO-2022/132389 A3 | 9/2022 |
| WO | WO-2023/287503 A2 | 1/2023 |
| WO | WO-2023/287503 A3 | 1/2023 |
| WO | WO-2023/287503 A9 | 1/2023 |
| WO | WO-2023/080936 A2 | 5/2023 |
| WO | WO-2023/080936 A3 | 7/2023 |
| WO | WO-2023/132865 | 7/2023 |
| WO | WO-2023/132865 A9 | 7/2023 |
| WO | WO-2024/155291 A2 | 7/2024 |

OTHER PUBLICATIONS

Anonymous., "Magneto-optical trap," Wikipedia, retrieved online <https://web.archive.org/web/20210125084412/https://en.wikipedia.org/wiki/Magneto-optical_trap>: 7 pages (2022).
Cong et al., "Quantum convolutional neural networks" Nature Physics, vol. 15, p. 1273-78 (2019).
Extended European Search Report for EP Application No. 19854402.5 dated May 9, 2022.
Extended European Search Report for EP Application No. 19868908.5 dated Jun. 13, 2022.
Grant et al., "Hierarchical quantum classifiers" ARXIV, p. 1-16 (2018).
International Search Report and Written Opinion for International Application No. PCT/US2022/016173 dated May 24, 2022.
Killoran et al., "Continuous-variable quantum neural networks" ARXIV, p. 1-21 (2018).
Kim and Swingle., "Robust entanglement renormalization on a noisy quantum computer" ARXIV, p. 1-17 (2017).
Morgado et al., "Quantum simulation and computing with Rydberg-interacting qubits," Arxiv, Cornell University Library: 36 pages (2020).
Tanasittikosol et al., "Microwave dressing of Rydberg dark states," Arxiv, Cornell University Library: 12 pages (2011).
Verdon et al., "A Universal Training Algorithm for Quantum Deep Learning" ARXIV, p. 1-83, (2018).
Wu et al., "Erasure conversion for fault-tolerant quantum computing in alkaline earth Rydberg atom arrays," arXiv.org: 16 pages (2022).
Auger et al., "Blueprint for fault-tolerant quantum computation with Rydberg atoms." Physical Review A 96(5): 052320 (2017).
Beugnon et al., "Two-dimensional transport and transfer of a single atomic qubit in optical tweezers" Nature Physics, vol. 3, p. 1-4 (2007).
Chao et al., "Fault-tolerant quantum computation with few qubits." npj Quantum Information 4.1 (2018): 42.
Cong et al., "Hardware-efficient, fault-tolerant quantum computation with Rydberg atoms", Physical Review X 12(2): 021049 (2022).
Couvert et al., "Optimal transport of ultracold atoms in the non-adiabatic regime" Europhysics Letters, 83: 5 pages (2008).
Dordevic et al., "Entanglement transport and a nanophotonic interface for atoms in optical tweezers" arXiv: 16 pages (2021).
Fowler et al., "Surface code quantum communication" arXiv, pp. 1-4 (2010).
Fowler et al., "Surface Codes: Towards practical large-scale quantum computation" Physical Review, vol. 86 (3), p. 1-54 (2012).
Graham et al., "Demonstration of multi-qubit entanglement and algorithms on a programmable neutral atom quantum computer" arXiv, p. 1-25 (2022).

(56) References Cited

OTHER PUBLICATIONS

Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion for International Application No. PCT/US2022/031297 dated Feb. 21, 2023.
International Search Report and Written Opinion of Application No. PCT/US2021/060138 dated Aug. 19, 2022.
Kaufman et al., "Quantum thermalization through entanglement in an isolated many-body system" arXiv: 19 pages (2016).
Labuhn et al., "Realizing quantum Ising models in tunable two-dimensional arrays of single Rydberg atoms" arXiv: 1-12 (2016).
Lengwenus et al., "Coherent Transport of Atomic Quantum in a Scalable Shift Register" Physical Review Letters, 105: 4 pages (2010).
Low et al., "Practical trapped-ion protocols for universal qudit-based quantum computing", Physical Review Research 2(3): 033128 (2020).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Satzinger et al. "Realizing topologically ordered states on a quantum processor," 27 pages, (2021).
Savary et al., "Quantum Spin Liquids" arXiv: 60 pages (2016).
Yang et al., "Coherence Preservation of a Single Neutral Atom Qubit Transferred between Magic-Intensity Optical Traps" Physical Review Letter, 117: 6 pages (2016).
Yoder et al., "Universal fault-tolerant gates on concatenated stabilizer codes", Physical Review X 6(3): 031039 (2016).
Levine, "Quantum Information Processing and Quantum Simulation with Programmable Rydberg Atom Arrays" The Department of Physics at Harvard University, PHD Thesis, published Jan. 12, 2022.
Monroe et al., "Remapping the quantum frontier." Physics World 21.08 (2008): 32.
Du et al., "Superconducting circuit probe for analog quantum simulators", Physical Review A 92(1): 012330 (2015).
International Search Report and Written Opinion for Application No. PCT/US2022/039189 dated Aug. 4, 2023.
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.
Levine, "Quantum Information Processing and Quantum Simulation with Programmable Rydberg Atom Arrays" The Department of Physics at Harvard University, PHD Thesis (2021).
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).
Willner et al., "Optics and photonics: Key enabling technologies", *Proceedings of the IEEE* 100.Special Centennial Issue: 1604-1643 (2012).
Adachi et al., "Application of Quantum Annealing to Training of Deep Neural Networks," arXiv.org: 18 pages (2015).
Barredo et al., "An atom-by-atom assembler of defect-free arbitrary 2d atomic arrays," arXiv:1607.03042, Jul. 11, 2016, pp. 1-7.
Barredo et al., "An atom-by-atom assembler of defect-free arbitrary two-dimensional atomic arrays," Science, 354(6315): 1021-1023 (2016).
Barredo et al., "Synthetic three-dimensional atomic structures assembled atom by atom," Nature, 561: 79-82 (2018).
Baur et al., "Single-Photon Switch Based on Rydberg Blockade," Phys. Rev. Lett., 112: 073901 (2014).
Brion et al., "Quantum Computing with Collective Ensembles of Multilevel Systems," Phys. Rev. Lett., 99: 260501 (2007).
Browaeys et al., "Many-body physics with individually controlled Rydberg atoms," Nature Physics, 16: 132-142 (2020).
Bruzewicz et al., "Trapped-Ion Quantum Computing: Progress and Challenges," Applied Physics Reviews, 6(2): 021314 (2019).
Debnath et al., "Demonstration of a small programmable quantum computer with atomic qubits," Nature, 536(7614): 63-66 (2016).
Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv: 1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. EP 18831504 mailed Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface codes: Towards practical large-scale quantum computation," Phys. Rev. A, 86: 032324 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction-Enhanced Imaging," Science, 342(6161): 954-956 (2013).
Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15): 1153-1156 (1983).
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2019/054831 dated Feb. 6, 2020.
International Search Report and Written Opinion for International Application No. PCT/US2020/019309 dated Jul. 14, 2020.
International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 mailed May 3, 2021.
Isenhower et al., "Demonstration of a neutral atom controlled—NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Jaksch et al., "The cold atom Hubbard toolbox," Arxiv, (30 pages) (2004).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv:1312.7182, Jun. 17, 2014, pp. 1-17.

(56) References Cited

OTHER PUBLICATIONS

Labuhn et al., "Tunable two-demensional arrays of single Rydberg atoms for realizing quantum Ising models," Nature, 534(7609): 667-670 (2016).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).
Mehta et al., "Towards fast and scalable trapped-ion quantum logic with integrated photonics," Proc. SPIE 10933, Advances in Photonics of Quantum Computing, Memory, and Communication XII, 109330B (2019).
Murmann et al., "Two Fermions in a Double Well: Exploring a Fundamental Building Block of the Hubbard Model," arXiv:1410.8784, Feb. 17, 2015, pp. 1-12.
Negretti et al., "Quantum computing implementation with neutral particles," Arxiv, (19 pages) (2011).
Nogrette et al., "Single-Atom Trapping in Holographic 2D Arrays of Microtraps with Arbitrary Geometries," Physical Review X, 4: Article 021034 pp. 1-9 (2014).
Perez-Garcia et al., "PEPS as unique ground states of local Hamiltonians," Quant. Inf. Comp., 8: 0650 (2008).
Persson et al., "An algorithm for improved control of trap intensities in holographic optical tweezers," Proceedings of SPIE, 8458: 8 pages (2012).
Persson et al., "Minimizing intensity fluctuations in dynamic holographic optical tweezers by restricted phase change," Optics Express, 18(11): 11250-11263 (2010).
Persson et al., "Real-time generation of fully optimized holograms for optical trapping applications," Proceedings of SPIE, 8097: 10 pages (2011).
Persson et al., "Reducing the effect of pixel crosstalk in phase only spatial light modulators," Optics Express, 20(20): 22334-22343 (2012).
Persson., "Thesis for the Degree of Doctor of Philosophy: Advances in Holographic Optical Trapping," Department of Physics University o Gothenburg: 82 pages (2013).
Pichler et al., "Computational complexity of the Rydberg blockade in two dimensions," arXiv: 1809.04954 (2018).
Poland et al., "Development of a doubly weighted Gerchberg-Saxton algorithm for use in multibeam imaging applications," Optics Letters, 39(8): 2431-2434 (2014).
Pollmann et al., "Detection of symmetry-protected topological phases in one dimension," Phys. Rev. B, 86(12): 125441-1-13 (2012).
Prongue et al., "Optimized kinoform structures for highly efficient fan-out elements," Applied Optics, 31(26): 5706-5711 (1992).

Saffman et al., "Quantum information with Rydberg atoms," Rev. Mod. Phys., 82(3): 2313-2363 (2010).
Saffman et al., "Scaling the neutral-atom Rydberg gate quantum computer by collective encoding in holmium atoms," Phys. Rev. A, 78: 012336 (2008).
Shi, "Deutsch, Toffoli, and CNOT Gates via Rydberg Blockade of Neutral Atoms," arxiv.org, Cornell University Library, 201 Olin Library Cornell University Ithaca, NY (2018).
Shi, "Fast, Accurate, and Realizable Two-Qubit Entangling Gates by Quantum Interference in Detuned Rabi Cycles of Rydberg Atoms," arxiv.org, Cornell University Library, 201 Olin Library Cornell University Ithaca, Ny (2019).
Sorace-Agaskar et al., "Multi-layer integrated photonics from the ultraviolet to the infrared," Proc. SPIE 10510, Frontiers in Biological Detection: From Nanosensors to Systems X, 105100D (2018).
Tamura et al., "Highly uniform holographic microtrap arrays for single atom trapping using a feedback optimization of in-trap fluorescence measurements," Optics Express, 24(8): 8132-8141 (2016).
Thimons et al., "Investigating the Gerchberg-Saxton Phase Retrieval Algorithm," SIAM: 11 pages (2018).
Torlai et al., "Integrating Neural Networks with a Quantum Simulator for State Reconstruction," Cornell University Library, (15 pages) (2019).
Urban et al., "Observation of Rydberg blockade between two atoms," Nature Physics, 5: 110-114 (2009).
Verresen et al., "One-dimensional symmetry protected topological phases and their transitions," Phys. Rev. B, 96(16): 165124-1-23 (2017).
Verstraete et al., "Criticality, the Area Law, and the Computational Power of Projected Entangled Pair States," Phys. Rev. Lett., 96: 220601 (2006).
Vidal, "Class of Quantum Many-Body States That Can Be Efficiently Simulated," Phys. Rev. Lett., 101(11): 110501-1-4 (2008).
Wang et al., "Coherent Addressing of Individual Neutral Atoms in a 3D Optical Lattice," Physical Review Letters, 115(4): 043003-1-5 (2015).
Yavuz et al., "Fast Ground State Manipulation of Neutral Atoms in Microscopic Optical Traps," Physical Review Letters, 96(6): 063001-1-4 (2006).
Ying, "Entangled Many-Body States as Resources of Quantum Information Processing," Center for Quantum Technologies National University of Singapore (2013).
Zimmermann et al., "High-resolution imaging of ultracold fermions in microscopically tailored optical potentials," arXiv:1011.1004, Apr. 8, 2011, pp. 1-15.
International Search Report and Written Opinion for International Application No. PCT/US23/26737 dated Sep. 30, 2024.
Jaksch et al., "Fast quantum gates for neutral atoms." arXiv (2000): 2208.
Keating et al., "Robust quantum logic in neutral atoms via adiabatic Rydberg dressing." Physical Review A 91 (2015): 012337.
Nickerson et al., "Freely scalable quantum technologies using cells of 5-to-50 qubits with very lossy and noisy photonic links." Physical Review X 4.4 (2014): 041041.
Ramette et al., "Fault-tolerant connection of error-corrected qubits with noisy links." npj Quantum Information 10.1 (2024): 58.
Weimer et al. "A Rydberg quantum simulator." Nature Physics 6.5 (2010): 382-388.

* cited by examiner

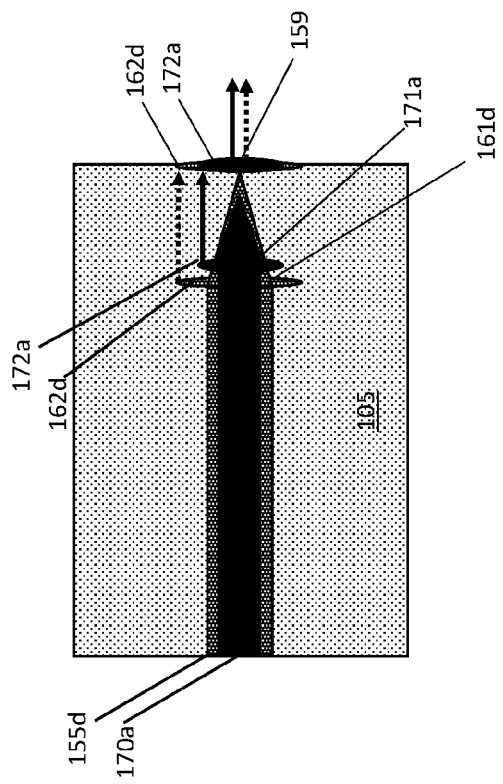
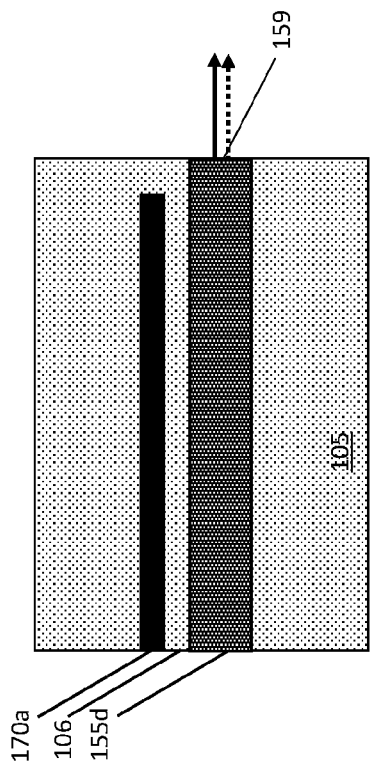
FIG. 1G
FIG. 1F

SYSTEM AND METHOD FOR MULTIPLEXED OPTICAL ADDRESSING OF ATOMIC MEMORIES

CROSS-REFERENCE TO RELATED APPLICATIONS

This application is the U.S. National Stage of International Application No. PCT/US2020/033100, filed May 15, 2020, which designates the U.S., published in English, and claims the benefit of U.S. Provisional Application No. 62/849,278, filed on May 17, 2019. The entire teachings of the above applications are incorporated herein by reference.

STATEMENT REGARDING FEDERALLY SPONSORED RESEARCH OR DEVELOPMENT

This invention was made with government support under FA9550-16-1-0391 and FA8750-16-2-0141 awarded by the Air Force Office of Scientific Research, OAC-1839159, PHY-1506284, and PHY-1125846 awarded by the National Science Foundation, and N00014-15-1-2846 awarded by the Office of Naval Research. The government has certain rights in the invention.

BACKGROUND

Arrays of neutral atoms with Rydberg interactions have emerged as a powerful platform for quantum computing. See Hannes Berrien, Sylvain Schwartz, Alexander Keesling, Harry Levine, Ahmed Omran, Hannes Pichler, Soonwon Choi, et al., *Probing Many-Body Dynamics on a 51-Atom Quantum Simulator*, Nature 551 (7682): 579-84 (2017); Manuel Endres, Hannes Berrien, Alexander Keesling, Harry Levine, Eric R. Anschuetz, Alexandre Krajenbrink, Crystal Senko, Vladan Vuletic, Markus Greiner, and Mikhail D. Lukin, *Atom-by-Atom Assembly of Defect-Free One-Dimensional Cold Atom Arrays*, Science 354 (6315): 1024-27 (2016), which are hereby incorporated by reference in their entireties. To realize more general algorithms, it is necessary to develop methods for optically addressing individual atoms. Scalable optical control of many-body quantum systems, such as arrays of atoms, or arrays of defects or trapped ions (e.g., nitrogen-vacancies in diamond) in solids, requires precise modulation of many optical channels at specific wavelengths. Presently available optical systems, however, cannot fulfill the desired performance requirements that include delivery of tens to hundreds of laser beams to closely spaced (e.g., 3 μm) atoms at required wavelengths (e.g., 370 nm, 420 nm, 780 nm, and 1013 nm), on-off amplitude modulation contrast on each channel in excess of 50 dB, phase modulation contrast, up to 1 mW of optical power per beam at wavelengths of 370 nm, 420 nm, and 780 nm, and up to 10 mW at 1013 nm.

Therefore, there is a continuing need for systems and methods for multiplexed optical addressing of atomic memories.

SUMMARY

In an example embodiment, the present disclosure provides a system for optically modulating a plurality of optical channels, the system comprising a power delivery module adapted to convert a coherent light beam into a plurality of optical channels, and at least one optical modulator, optically coupled to the power delivery module, the at least one optical modulator adapted to optically modulate each of the plurality of the optical channels. The system further includes a vacuum chamber having a trapping plane therein, the vacuum chamber adapted to generate an addressable array of trapped particles at the trapping plane, wherein each of the plurality of optical channels is optically coupled to at least one of the trapped particles of the addressable array.

In another example embodiment, the present disclosure provides a method for optically modulating a plurality of optical channels, the method comprising converting a coherent light beam into a plurality of optical channels, delivering the plurality of optical channels to at least one optical modulator, the at least one optical modulator adapted to optically modulate each of the plurality of optical channels, optically modulating at least one of the plurality of optical channels, and optically coupling at least one of the plurality of optical channels to at least one of a plurality of trapped particles disposed at a trapping plane of a vacuum chamber adapted to generate an addressable array of the plurality of trapped particles therein.

The systems and methods described above have many advantages, such as precision laser delivery to large numbers of atoms or atom-like systems for applications in quantum information processing.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 1F is a schematic diagram representing a side view of a photonic integrated circuit employed in example embodiments of the system described herein.

FIG. 1G is a schematic diagram representing a top view of the photonic integrated circuit shown in FIG. 1F.

DETAILED DESCRIPTION

According to some embodiments, the present disclosure describes methods and systems for precision laser delivery to a large number of atoms or atom-like systems for applications in quantum information processing. In some example implementations, photonic integrated circuit (PIC) systems including arrays of nanophotonic optical modulators enable high-speed simultaneous control of 1D and 2D arrays of atoms. Multi-qubit gates—a core component of quantum information processing—can be applied by exciting adjacent atoms that experience a strong and coherent interaction when both atoms are in the Rydberg state. This technology potentially enables a new generation of quantum experiments beyond observation of quantum phenomena, and towards large-scale control of many-body quantum systems. Arrays of nanophotonic optical modulators in PICs for high-speed simultaneous control of 1D and 2D arrays of atoms are described herein, starting with PICs based on lithium niobate-on-insulator technology, followed by active UV-visible-infrared photonics in wide-bandgap materials such as lithium niobate (LN) and aluminum nitride-on-sapphire for controlling the Rydberg transitions of individual Rubidium atoms in an array of optical traps. See Lu, Tsung-Ju, Michael Fanto, Hyeongrak Choi, Paul Thomas, Jeffrey Steidle, Sara Mouradian, Wei Kong, Di Zhu, Hyowon Moon, Karl Berggren, Jeehwan Kim, Mohammad Soltani, Stefan Preble, and Dirk Englund, "Aluminum Nitride Integrated Photonics Platform for the Ultraviolet to Visible Spectrum." Optics Express 26 (9): 11147-60 (2018), which is hereby incorporated by reference in its entirety. Among several operational requirements, the photonics need to deliver high-speed pulses at a wavelength of λ=420 nm, optical power on the order of 100 µW at each atom, and a nanosecond switching time with >4V modulation and 40 dB extinction.

Figure 1A:
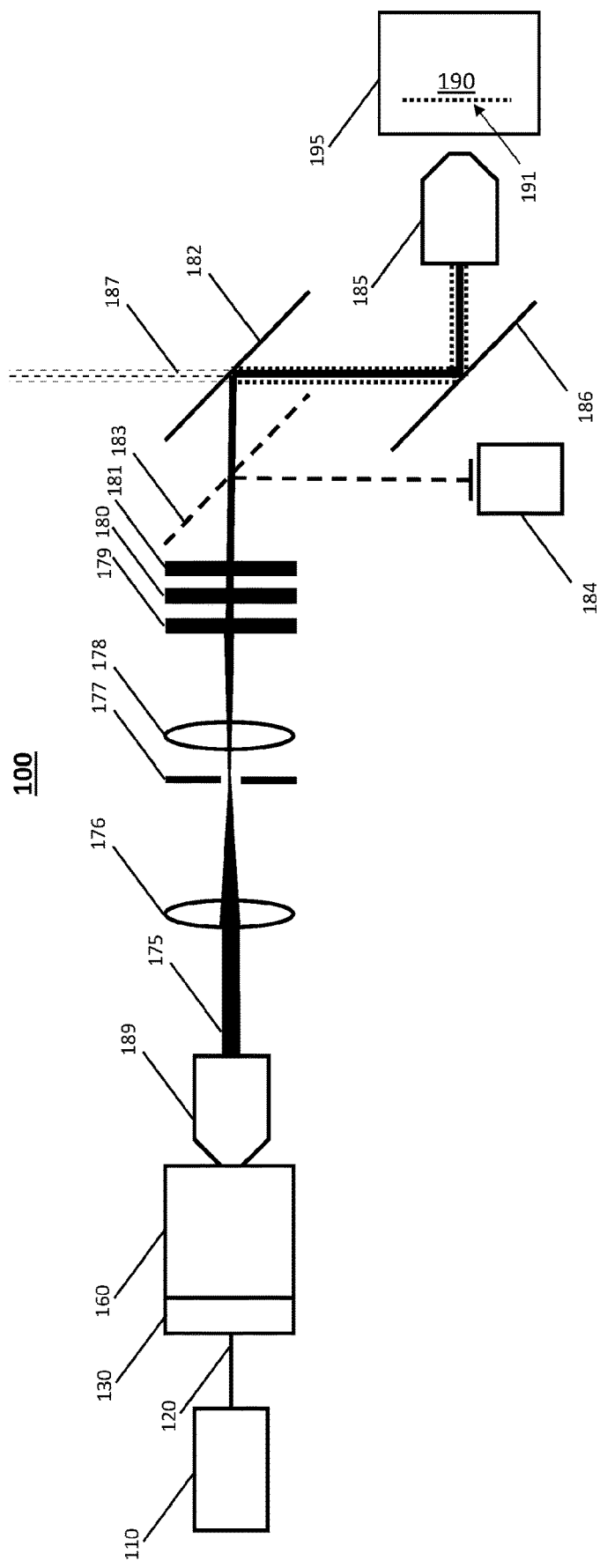
FIG. 1A is a schematic diagram representing an example embodiment of an optical train of a system described herein.
Figure 1B:
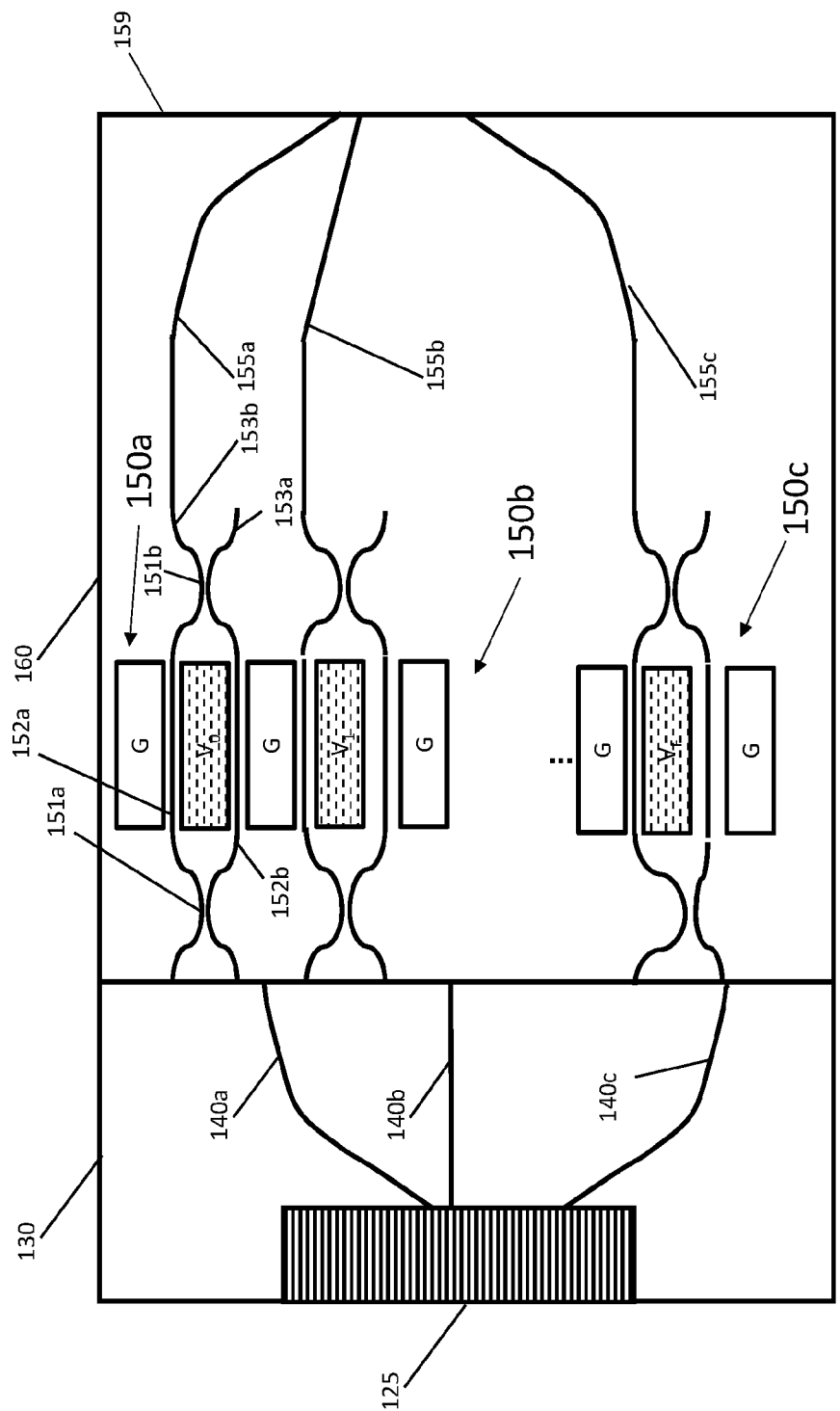
FIG. 1B is a schematic diagram representing a photonic integrated circuit employed in example embodiments of the system described herein.

FIG. 1A is a schematic diagram representing an example embodiment of an optical train of a system 100 for optically modulating a plurality of optical channels, according to some embodiments described herein. As shown in FIGS. 1A and 1B, in certain embodiments, a power delivery module 130 is adapted to convert a coherent light beam 120 into a plurality of optical channels (e.g., 16 channels, of which optical channels 140a, 140b, and 140c are shown in FIG. 1B). In some example embodiments, the coherent light beam 120 is produced by a coherent light source 110 that is optically coupled to the power delivery module 130 via an optic fiber array 125 that is optically coupled into the plurality of optical channels 140a, 140b, 140c, etc. In some embodiments, the power delivery module comprises at least one beam splitter (not shown) in addition to, optically coupled to, or as a part of an optic fiber array 125. In certain of these embodiments, the power delivery module comprises at least one electrically controlled optical modulator adapted to modulate the at least one beam splitter (not shown). Optical system 100 also includes at least one optical modulator (150a, 150b, 150c, etc., shown in FIG. 1B) that are optically coupled to the power delivery module 130. Optical modulators 150a, 150b, 150c, etc. are adapted to optically modulate each of the plurality of optical channels 140a, 140b, 140c, etc. In an example embodiment shown in FIG. 1B, upon modulation, optical channels 140 can be fanned out into an array of output waveguides 155a, 155b, 155c, etc. at the edge 159 of a photonic integrated circuit (PIC) 160, described in detail hereinbelow. The light from the array of waveguides 155a, 155b, 155c, etc. is collected by objective 189 (FIG. 1A), e.g., a high (e.g., 0.9) numerical aperture (NA) objective. The light from the array of waveguides 155a, 155b, 155c, etc. is typically polarized in one direction, and therefore, as shown in FIG. 1A, beam 175 produced by objective 189 includes optical signals carried by waveguides 155a, 155b, 155c, etc. Beam 175 can be guided by lenses 176 and 178 through a pinhole 177, a cleanup polarizer 180 to remove stray light polarized in the other direction, an optical cleanup filter (e.g., dichroic mirror) 182 to remove stray non-linear conversion 187, and then converted to a desired (e.g., circular) polarization with a half-wave (λ/2) plate 179 and a quarter wave (λ/4) plate 181, followed by being imaged by mirror 186 and objective 185 onto an array of trapped particles (e.g., atoms) 190 inside vacuum chamber 195. A flip mirror 183 and alignment camera 184 are also shown in FIG. 1A. The vacuum chamber 195 has a trapping plane 191 therein, and the vacuum chamber 195 is adapted so that array 190 of trapped particles is addressable. The optical train shown in FIG. 1A is configured so that each of the plurality of optical channels 140a, 140b, 140c, etc, shown in FIG. 1B, is optically coupled to at least one of the trapped particles of array 190.

Figure 1C:
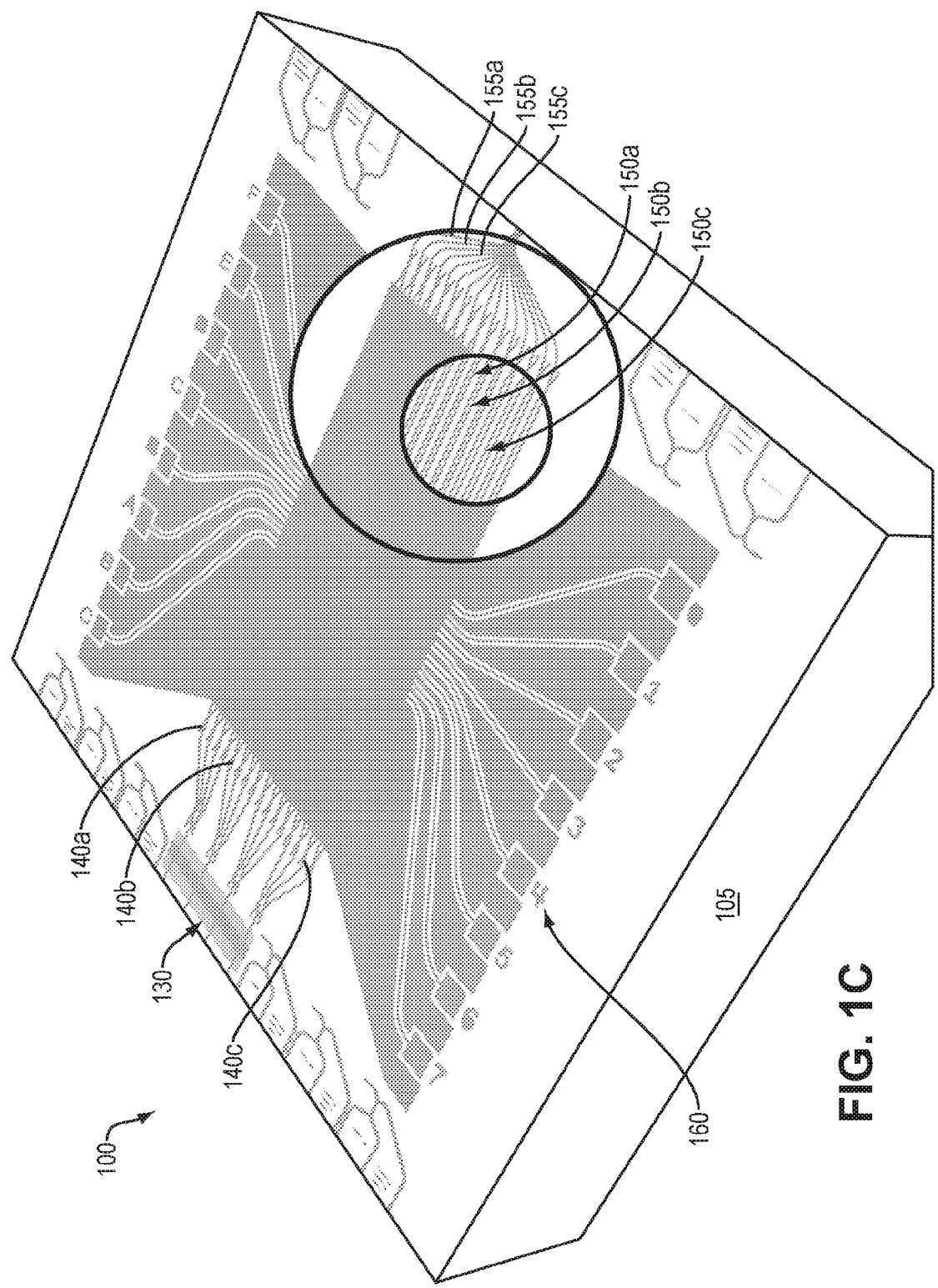
FIG. 1C is another schematic diagram representing a photonic integrated circuit employed in example embodiments of the system described herein.

Turning to FIG. 1C, an example embodiment of photonic integrated circuit (PIC) 160 is shown. PIC 160 includes optical modulators 150a, 150b, 150c, etc., and the array of output waveguides 155a, 155b, 155c, etc., and can be fabricated on substrate 105 that is optically transparent (i.e., Abs≤0.1) at wavelengths in a range of between 400 nm and 1600 nm. Suitable materials for substrate 105 include lithium niobate, lithium tantalate, $Al_xGa_{1-x}N$, silicon nitride (SiN), titanium dioxide ($TiO_2$), barium titanate (BTO), or alumina. Lithium niobate, particularly MgO-doped lithium niobate, has excellent electro-optic properties that enable fabrication of millimeter-scale electro-optically controlled optical modulators, as described further below. As also shown in FIG. 1C, the power delivery module 130 and the plurality of optical channels 140a, 140b, 140c, etc. can also be fabricated on the substrate 105.

Turning back to FIG. 1B, in some example embodiments, the optical modulators 150a, 150b, 150c, etc. each comprise an electro-optically controlled Mach-Zehnder interferometer (MZI), each of the plurality of the MZIs adapted to modulate one of the optical channels 140a, 140b, 140c, etc. The components of one MZI, the one controlling optical channel 140a, are labeled in FIG. 1B for clarity. As shown in FIG. 1B, in an MZI, two 50:50 directional couplers 151a and 151b are connected by two input arms 152a and 152b. A relative phase shift between the two input arms 152a and 152b is induced by a voltage Vo applied on input arm 152a that changes the refractive index (phase) on input arm 152a due to the electro-optic (EO) effect. The phase difference changes the coupling ratio of the input arm 152a and output arm 153b. Controlling the coupling ratio switches optical power output from one output port 153a of the output directional coupler 151b to the other output port 153b that is connected to the output waveguide 155a, thereby modulating the signal amplitude of each of the plurality of optical channels 140a.

In another example embodiment, optical modulators that can be employed by the systems described herein includes an MZI-coupled tunable resonator. This embodiment harnesses resonance effects to use the relatively weak electro-optic (EO) phase shift, such as the EO phase shift in aluminum nitride (AlN), to produce a much larger effect. In accordance with one or more such embodiments, in FIG. 2A optical modulator 200 is shown. Similarly to optical modulators 150a, 150b, 150c, etc. shown in FIGS. 1A-1D, optical modulator 200 can also be adapted to modulate one of the optical channels 140a, 140b, 140c, etc. Optical modulator 200 comprises resonator 215 that includes loop 210 coupled to waveguide 220. When a condition called critical coupling is satisfied, that is, when the loss in loop 210 is equal to the input, and when the loop 210 is resonant at the wavelength of the optical input 204, optical power is completely removed from waveguide 204, creating a perfect off switch. To quickly turn the optical power back on, the EO effect can be used to slightly detune the loop 210 from resonance. This optical modulation scheme works well when the precise value of the wavelength is arbitrary. When the modulated wavelengths are defined by specific atomic transitions, then additional tuning is required, because, for example, random fabrication errors can affect both the resonance and critical coupling conditions, and the EO effect is not likely to fully correct for these errors. The critical coupling condition can further be tuned by replacing a coupling junction with MZI 230. Both the resonance and critical coupling conditions can be tuned with local heaters, using the thermo-optic effect that is relatively slow, typically on the order of microseconds, because of the time required for materials to heat up. As shown in FIG. 2A, the critical coupling condition is tuned by replacing the coupling with an MZI 230, one arm 250 of which is equipped with MZI heater 245. Resonator 215 is also equipped with resonator heater 247. The standard geometry for AlN tuning is shown in FIG. 2A: two ground electrodes 225a and 225b straddling the waveguides 220a and 220b, with an EO signal electrode 235 buffered by dielectric from the waveguides 220a and 220b. This geometry produces a field in the z-direction, the direction of the EO effect in AlN. Current is injected through DC electrodes 240a and 240b into higher resistance metal electrodes (e.g., titanium) serving resonator heater 247 and MZI heater 245 and into ground electrodes 225a and 225b for thermo-optic tuning. The low resistance (e.g., Au) upper electrodes 240a and 240b are also used to bus the current to the device with minimized non-local heating. To reduce the power requirements of this optical modulator, reduce thermal crosstalk, and increase compactness, insulation trenches can be etched (air having a much lower thermal conductivity than the substrate) into the substrate, placing each heater on its own island. Bridges remain to support the waveguides and electrical connections. Diffraction grating 260 redirects the modulated output signal traveling through waveguide 206.

Figure 2A:
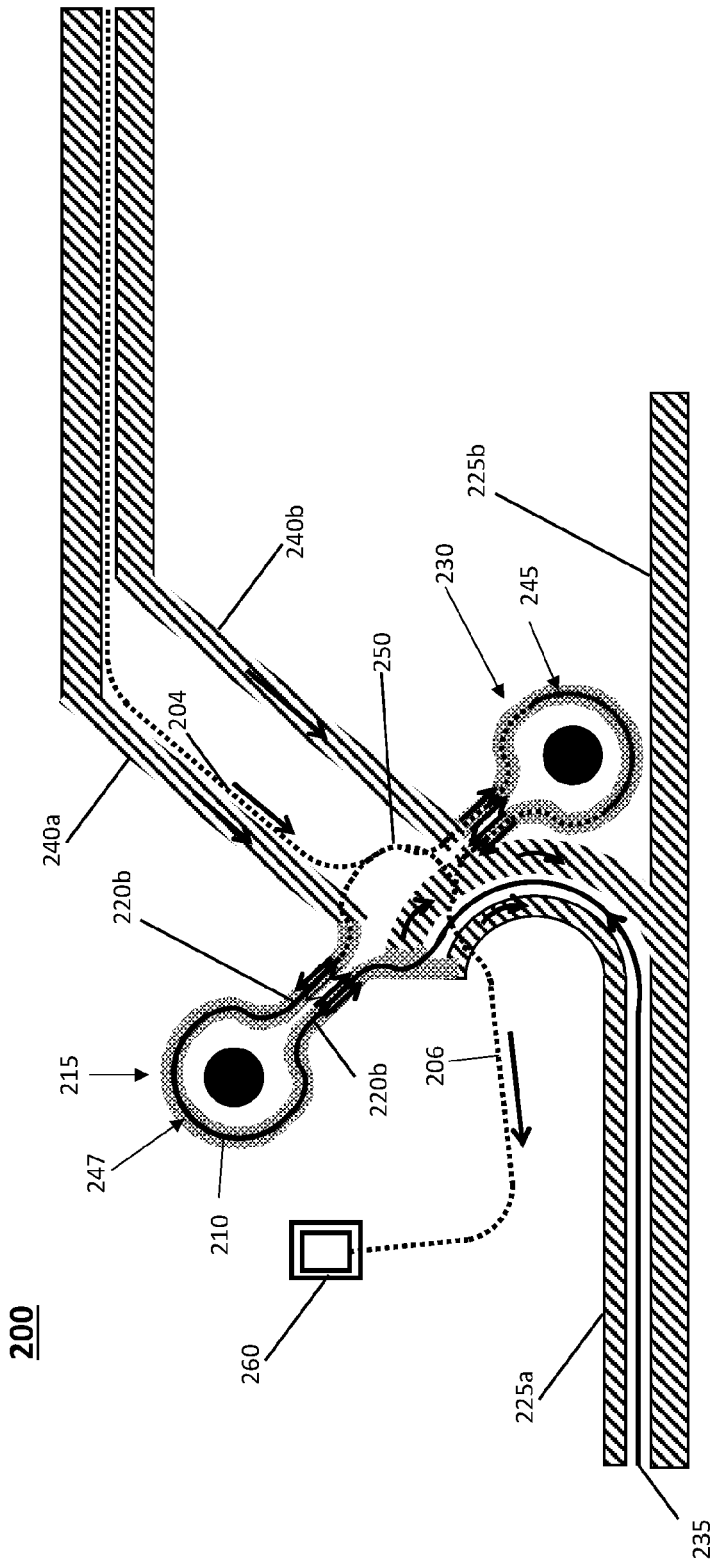
FIG. 2A is a schematic diagram representing an example embodiment of an optical modulator that can be used in the system described herein.
Figure 2B:
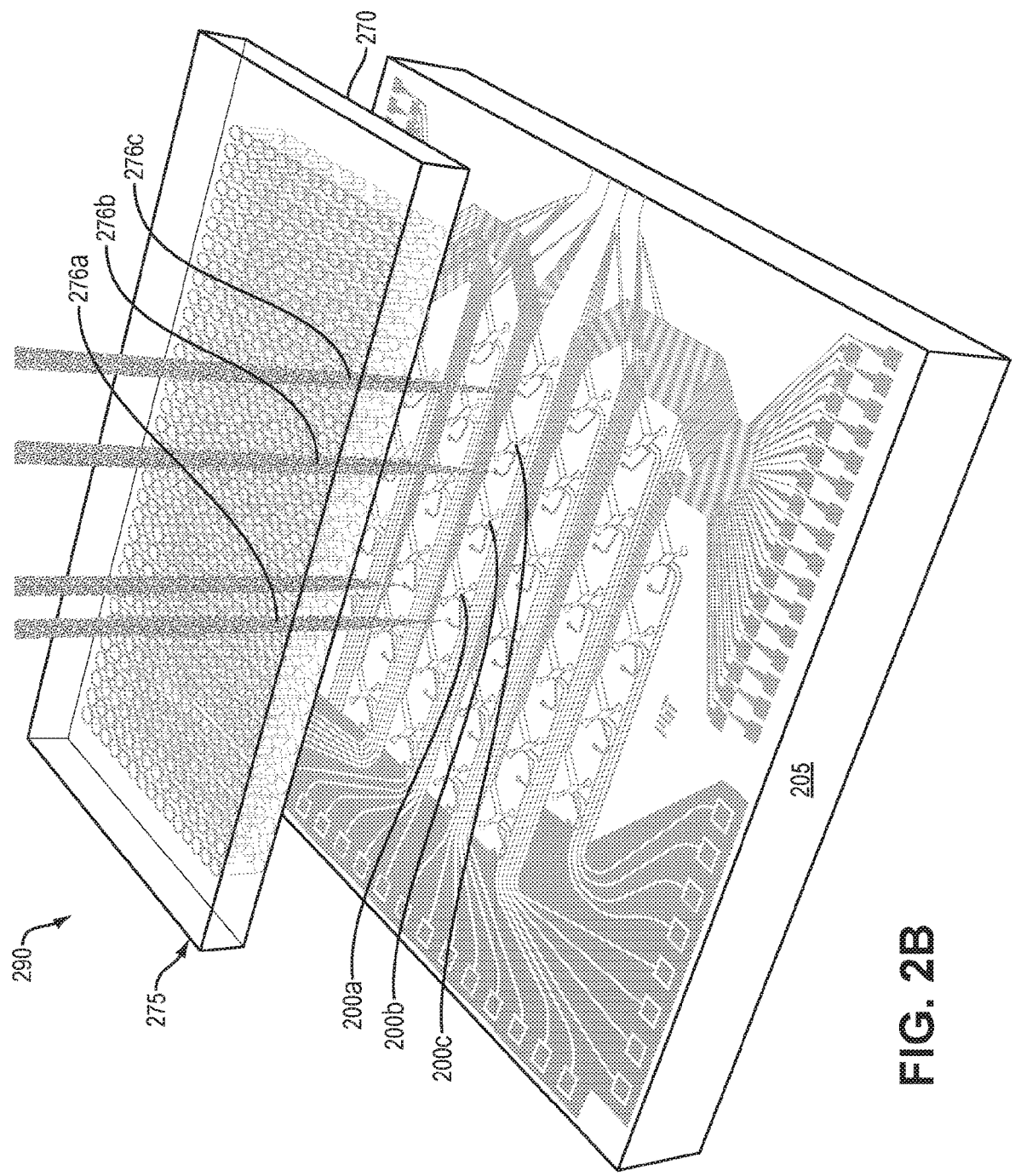
FIG. 2B is a schematic diagram representing an example embodiment of the system described herein that employs a microlens array.

Device 290 that includes an array of MZI-coupled tunable resonators 200a, 200b, 200c, etc. is shown in FIG. 2B. An output of each diffraction grating (not shown in FIG. 2B, labeled 260 in FIG. 2A) can be converted to a high-NA beam using microlens array 275. Each diffraction grating has its own lens 276a, 276b, 276c, etc. for NA conversion. Points on the surface of each microlens 276a, 276b, 276c etc. outside of the optical axis are collimated in different directions that can be blocked. In addition, metal can be fabricated around the diffraction gratings (not shown) to inhibit stray light that is close enough to the focal point of each microlens. Metal (e.g., chrome) can be fabricated at the plane of the microlens array 275 to remove light that does not travel through a desired lens. Alternatively, where the arrays of optical modulators 200a, 200b, 200c, etc. is formed on transparent photonic substrate 205, microlenses can be fabricated on the bottom surface of the substrate 205 (not shown), producing a completely integrated device.

Various embodiments of extracting modulated output from the optical modulators described herein are provided below.

Figure 1E:
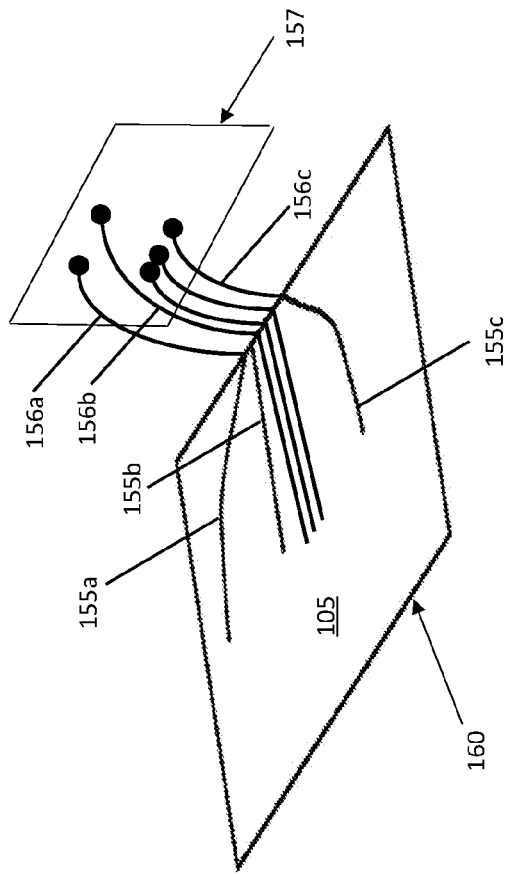
FIG. 1E is a schematic diagram representing an example embodiment of the system described herein.
Figure 1D:
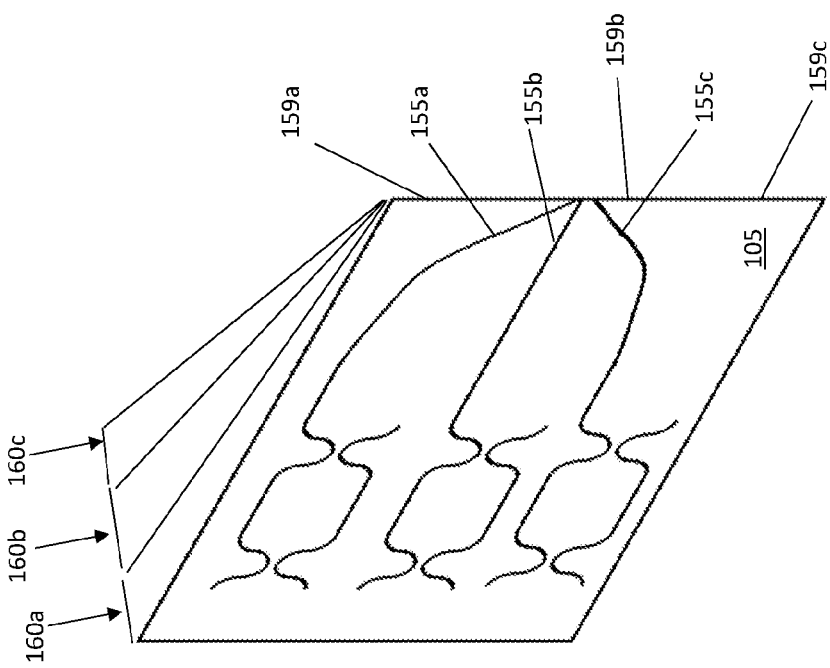
FIG. 1D is a schematic diagram representing an example embodiment of the photonic integrated circuits that can be used in the system described herein.

As shown in FIG. 1D, several PICs 160a, 160b, 160c, etc. can be manufactured so that their edges 159a, 159b, 159c, etc. are polished to a fine angle (e.g., angle≤10°), and arranged so that a combination of unidimensional arrays of output waveguides 155a, 155b, 155c, etc. for each PIC forms a two-dimensional (2D) output array. Alternatively, as shown in FIG. 1E, a single PIC 160 can be optically coupled to an array of waveguides 156a, 156b, 156c, etc. to form a 2D output array 157.

Figure 3A:
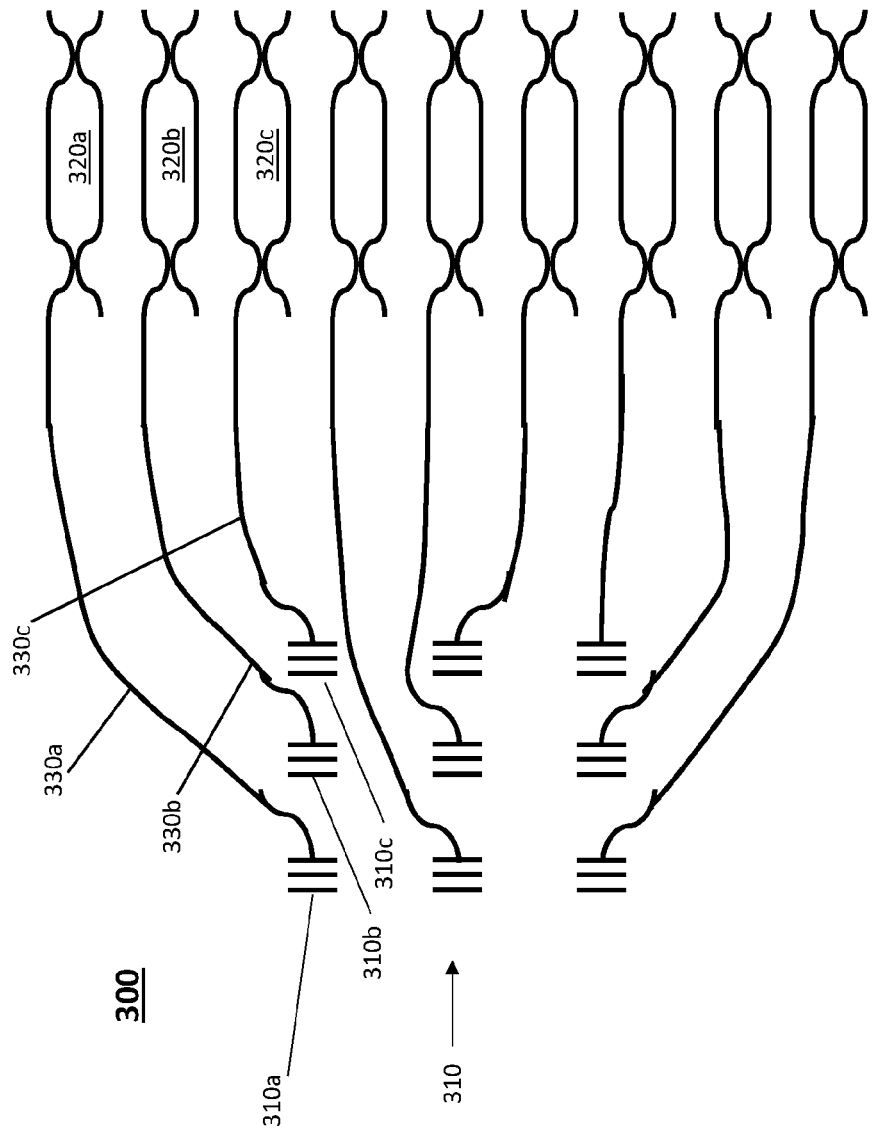
FIG. 3A is a schematic diagram representing an example embodiment of a layout of a photonic integrated circuit that can be used by the system described herein.
Figure 3B:
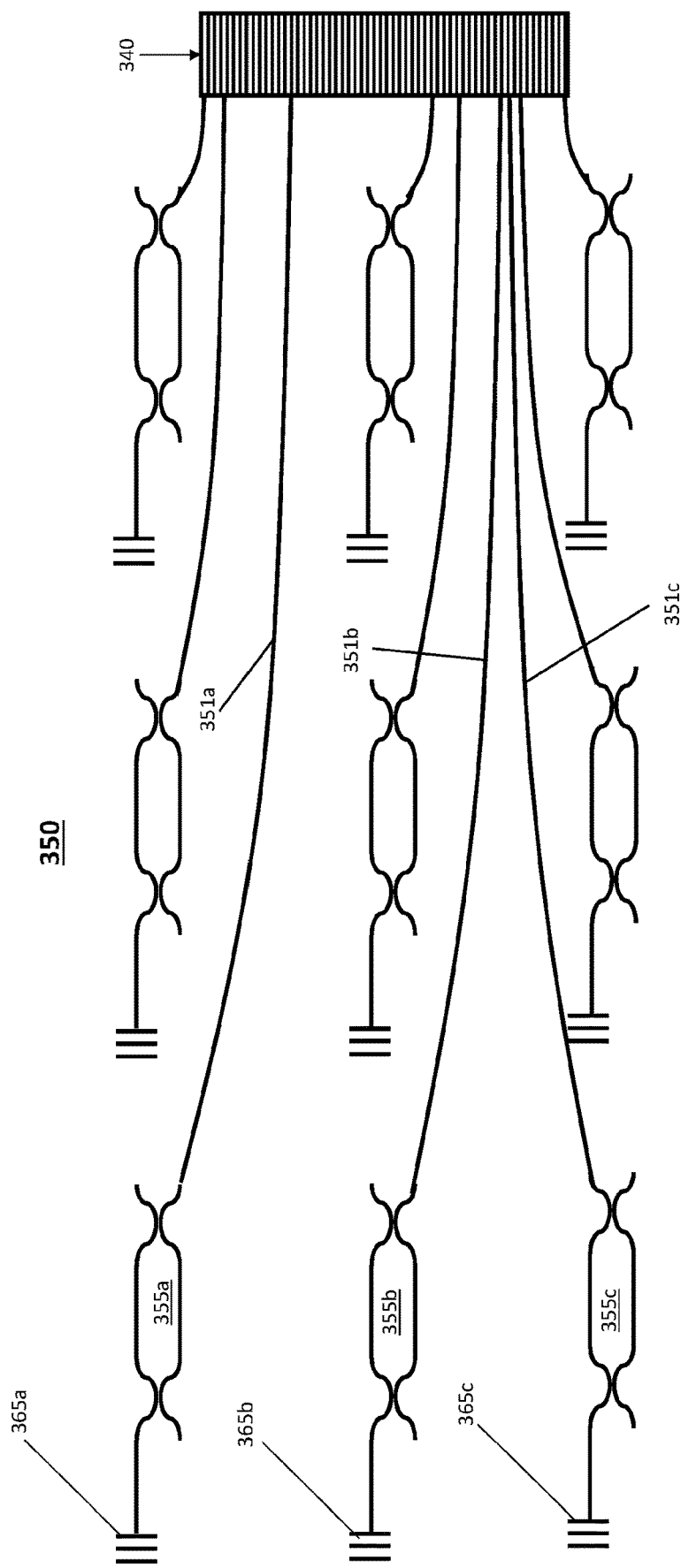
FIG. 3B is a schematic diagram representing another example embodiment of a layout of a photonic integrated circuit that can be used by the system described herein.

As shown in FIG. 3A, in accordance with some example embodiments, in optical modulator array 300 that comprises optical modulators 320a, 320b, 320c, etc., modulated output signals carried by waveguides 330a, 330b, 330c, etc. are outputted through diffraction gratings array 310. Diffraction gratings 310a, 310b, 310c, etc. can be arranged in a 2D or 1D pattern. Alternatively, as shown in FIG. 3B, optical modulator array 350 is shown. In array 350, each optical modulator 355a, 355b, 355c, etc. can be placed adjacent to diffraction grating 365a, 365b, 365c, etc, with single pump waveguide 340 supplying optical power to each optical modulator 355a, 355b, 355c, etc. via waveguides 351a, 351b, 351c, etc. In some embodiments, single pump waveguide 340 can supply each row, with pickoff couplers (not shown) taking a fraction of the optical power for each grating-coupled modulator 355a, 355b, 355c, etc.

Figure 4:
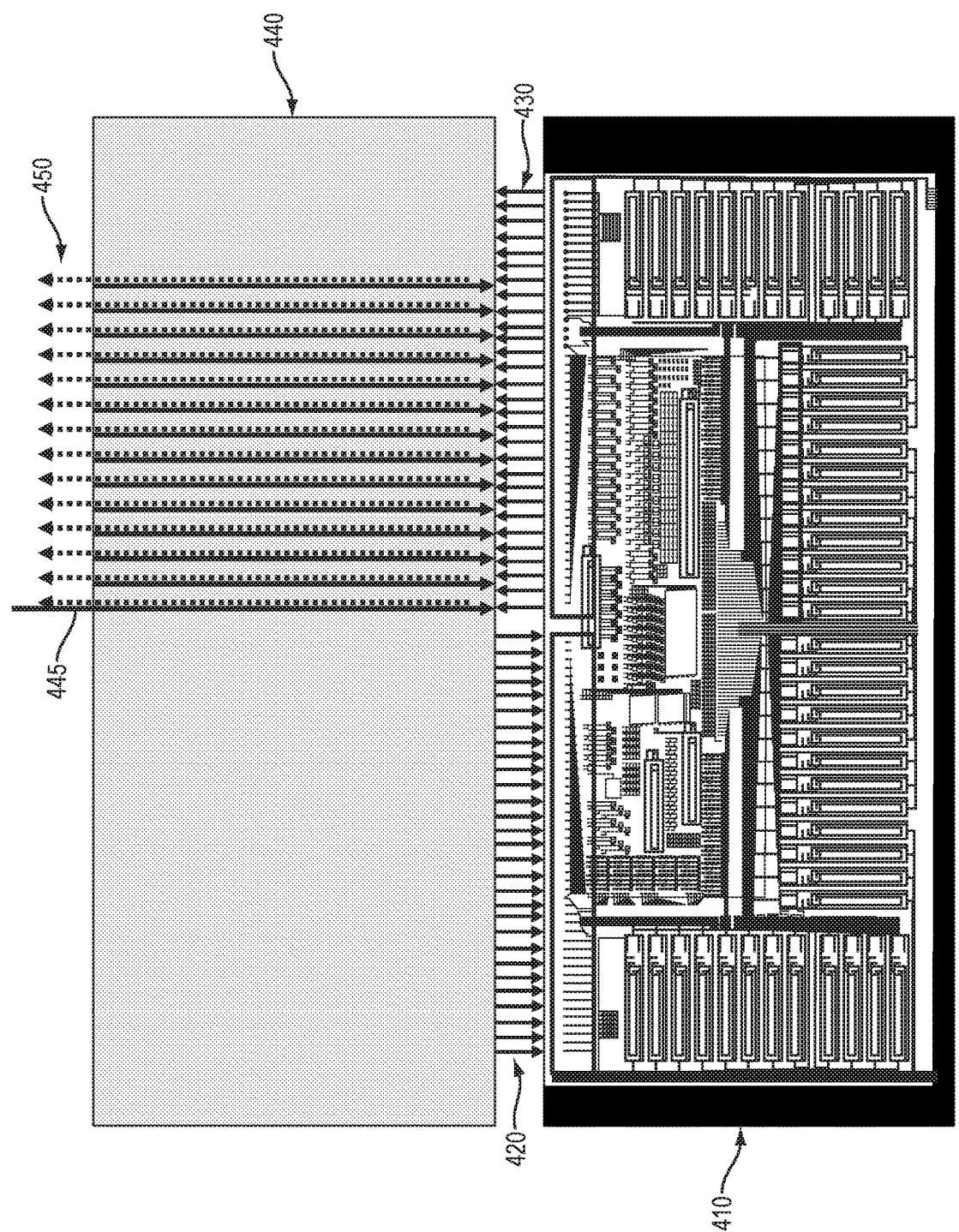
FIG. 4 is a schematic diagram representing an example embodiment of an optical modulator of the system described herein.

As an alternative to modulating laser beams at 420 nm on the UV-visible PICs described above, this active function can be accomplished using an already established PIC technology: silicon-on-insulator (SOI) PICs. SOI PIC technology, such as the SOI PIC 410 shown in FIG. 4, is available to modulate tens to hundreds of input waveguides 420, and SOI carrier depletion modulations can have high speed (in excess of 20 GHz) and can modulate relatively high power (in excess of 10 mW). See e.g., Elenion Technologies, New York, NY. Such SOI PICs can be used to modulate the required number of optical channels carried by input waveguides 420 in the NIR-IR wavelength ($\lambda$=1,100-1,700 nm). The modulated output beams 430 can be used for controlling atomic optical transitions above a wavelength of 1,100 nm. For controlling UV atomic optical transitions, the modulated output beams 430 can be subsequently frequency-converted to, for example, 420 nm, by coupling the SOI PIC 410 to a frequency-conversion module 440. A PIC of AN or LN waveguides 440 can be adapted to convert an optical signal having a first frequency to an optical signal having a second frequency. Within PIC 440, two cascaded second harmonic generation (SHG) steps from 1,680 nm to 840 nm and then to 420 nm can be performed, or, as shown in FIG. 4, sum-frequency generation (SFG) from 1550 nm (modulated SOI PIC output 430) to 420 nm output 450 can be performed using a yellow (e.g., dye) laser (input 445) at about 570 nm, or by combining approximately 1,300 nm modulated SOI PIC output 430 with a 620 nm pump (also shown as input 445) to produce output at 420 nm (beams 450). The waveguides 440 can be periodically poled or width modulated for phase matching in frequency conversion.

In various embodiments of the systems described herein, the output of a PIC, positioned outside of the vacuum chamber, is imaged onto the addressable array of trapped particles located inside the vacuum chamber. This arrangement has several advantages. First, optical and electrical access to the PIC does not have to cross the vacuum seal of the vacuum chamber, improving the vacuum performance of the vacuum chamber and reducing its complexity. Second, during operation, the surface of the PIC can produce undesirable electric and magnetic fields that can negatively affect the performance of the addressable array of trapped particles. Third, during operation, the PIC can produce thermal fluctuations that can degrade the vacuum inside the vacuum chamber and the performance of the addressable array as a quantum memory.

In some embodiments, the PIC of present invention solves the problem of a possible relative movement of the photonic hardware and the vacuum chamber that contains trapped particles. This problem can be solved by allowing the same PIC to control beams of multiple wavelengths, such as trapping (tweezer) beams and gate (control) beams, that are then jointly projected onto the atom array. Such an arrangement beneficially allows to account for small movements of the photonic hardware handling the two types of beams, so that atoms are dragged along with any small motion of the tweezer beams while remaining within the optical field of the gate beam. (In certain embodiments, vibrational movements of the PIC can be additionally damped to be less than tens of Hz so that the atoms are not heated.) Nearby wavelengths (i.e., wavelengths that are within about 20-30% of the center wavelengths) can be readily combined onto the same waveguide using wavelength division multiplexing devices, such as arrayed waveguide gratings, unbalanced Mach-Zehnder interferometer add-drop multiplexers, or resonator-based add-drop filters. For example, for controlling Rubidium (Rb) atoms, the 780 nm (D2 line) and 795 nm (D1 line) channels, together with trapping beams at about 800-810 nm can all be controlled using the same layer of the photonic integrated circuit. As described above, the two-photon Rydberg transition employs additional laser fields at 420 nm and 1013 nm. The 1013 nm wavelength can be combined with the approximately 800 nm wavelengths on the same waveguide, as single-mode waveguide operation is still assured, although the 1013 nm laser field has a slightly larger evanescent field than the 800 nm wavelengths. The 420 nm laser field is too short in wavelength to be readily controlled in the same waveguide layer.

Referring now to FIG. 1F and FIG. 1G, and considering a 420 nm Rydberg laser field as an example, an additional (second) layer of gate waveguides configured to carry a gate beam of a second wavelength, such as the 420 nm Rydberg laser field (only one second layer gate waveguide 170a is shown) can be added onto substrate 105, separated from the first layer trapping waveguides that are optically coupled to at least one of the trapped particles of the addressable array (i.e. waveguides 155a, b, c, etc.; only one first layer waveguide, 155d, is shown in FIG. 1F and FIG. 1G). Second layer gate waveguides 170a, etc. can be disposed on PIC 160 shown in FIG. 1B. These second layer gate waveguides 170a, etc. can be added to the PIC during the fabrication of substrate 105. As shown in FIG. 1F and FIG. 1G, second layer gate waveguides 170a, etc. can be separated from the first layer waveguides 155a, b, c, d etc., by cladding 106, as shown schematically and not to scale in FIG. 1F. In an example embodiment, the cladding can be at least 2 μm of silicon dioxide ($SiO_2$). Two adjacent waveguides (such as 155d and 170a, shown in FIG. 1F and FIG. 1G), each having a cross section diameter that is approximately equal to half the respective wavelength inside the waveguide material, as shown in FIG. 1F, can be optically coupled into one channel through a staggered adiabatic tapering of the two waveguides, as illustrated in FIG. 1G with respect to waveguides 155d and 170a. The tapered portion 171a of the thinner waveguide 170a begins, along the length of waveguide 170a, closer to edge 159 than the tapered portion 161d of the thicker waveguide 155d, as shown in FIG. 1G. This allows to evanescently transfer shorter wavelength evanescent field 172a (e.g., blue light) from a second layer waveguide, such as waveguide 170a, using only a single-mode section of a first layer waveguide, such as waveguide 155d, and both the short wavelength evanescent field 172a and the slightly larger longer wavelength evanescent field 162d exit the PIC at the same point at the edge 159 of the PIC, thereby producing a combined multiplexed gate/trapping beam.

Accordingly, in a first example embodiment, the present invention is a system for optically modulating a plurality of optical channels. In a $1^{st}$ aspect of the first example embodiment, the system comprises a power delivery module adapted to convert a coherent light beam into a plurality of optical channels; at least one optical modulator, optically coupled to the power delivery module, the at least one optical modulator adapted to optically modulate each of the plurality of the optical channels; and a vacuum chamber having a trapping plane therein, the vacuum chamber adapted to generate an addressable array of trapped particles at the trapping plane, wherein each of the plurality of optical channels is optically coupled to at least one of the trapped particles of the addressable array.

In a $2^{nd}$ aspect of the first example embodiment, the system further comprises a coherent light source optically coupled to the power delivery module.

In a $3^{rd}$ aspect of the first example embodiment, the power delivery module comprises at least one beam splitter and an optic fiber array. Other features and example features of the system are as described above with respect to the $1^{st}$ through the $2^{nd}$ aspects of the first example embodiments.

In a $4^{th}$ aspect of the first example embodiment, the power delivery module comprises at least one electrically controlled optical modulator adapted to modulate the at least one beam splitter. Other features and example features of the system are as described above with respect to the $1^{st}$ through the $3^{rd}$ aspects of the first example embodiments.

In a $5^{th}$ aspect of the first example embodiment, the at least one optical modulator is configured to modulate a signal amplitude on each of the plurality of optical channels. Other features and example features of the system are as described above with respect to the $1^{st}$ through the $4^{th}$ aspects of the first example embodiments.

In a $6^{th}$ aspect of the first example embodiment, the at least one optical modulator is a photonic integrated circuit (PIC). Other features and example features of the system are as described above with respect to the $1^{st}$ through the $5^{th}$ aspects of the first example embodiments.

In a $7^{th}$ aspect of the first example embodiment, the at least one optical modulator comprises a plurality of electro-optically controlled Mach-Zehnder Interferometers (MZI), each of the plurality of the MZIs adapted to modulate one of the optical channels. Other features and example features of the system are as described above with respect to the $1^{st}$ through the $6^{th}$ aspects of the first example embodiments.

In an $8^{th}$ aspect of the first example embodiment, each of the plurality of MZIs comprise waveguides comprising a material selected from lithium niobate, lithium tantalate, $Al_xGa_{1-x}N$, SiN, titanium dioxide ($TiO_2$), barium titanate (BTO), or alumina. In one example embodiment, the material is lithium niobate. Other features and example features of the system are as described above with respect to the $1^{st}$ through the $7^{th}$ aspects of the first example embodiments.

In a $9^{th}$ aspect of the first example embodiment, the at least one optical modulator comprises a plurality of tunable resonators, each of the plurality of tunable resonators adapted to modulate one of the optical channels. Other features and example features of the system are as described above with respect to the $1^{st}$ through the $6^{th}$ aspects of the first example embodiments.

In a tenth aspect of the first example embodiment, each of the plurality of tunable resonators is a Mach-Zehnder Interferometer (MZI)-coupled resonator comprising a waveguide loop and an MZI. Other features and example features of the system are as described above with respect to the 1$^{st}$ through the 6$^{th}$ and the 9$^{th}$ aspect of the first example embodiments.

In an 11$^{th}$ aspect of the first example embodiment, each waveguide loop includes an electro-optically controlled section adapted to modulate the waveguide loop's refractive index. Other features and example features of the system are as described above with respect to the 1$^{st}$ through 6$^{th}$, and the 9$^{th}$ through the 10$^{th}$ aspects of the first example embodiments.

In a 12$^{th}$ aspect of the first example embodiment, the tunable resonator includes a waveguide heating element adapted to modulate the waveguide loop's refractive index. Other features and example features of the system are as described above with respect to the 1$^{st}$ through the 6$^{th}$ and the 9$^{th}$ through the 11$^{th}$ aspects of the first example embodiments.

In a 13$^{th}$ aspect of the first example embodiment, the MZI includes a first arm and a second arm, and the tunable resonator includes an MZI heating element adapted to modulate a refractive index of at least the first or the second arm. Other features and example features of the system are as described above with respect to the 1$^{st}$ through 6$^{th}$ and the 9$^{th}$ through the 12$^{th}$ aspects of the first example embodiments.

In a 14$^{th}$ aspect of the first example embodiment, the at least one optical modulator comprises a Silicon-on-Insulator (SOI) photonic integrated circuit (PIC), said SOI PIC adapted to optically modulate each of the plurality of the optical channels. Other features and example features of the system are as described above with respect to the 1st through the 6$^{th}$ aspects of the first example embodiments.

In a 15$^{th}$ aspect of the first example embodiment, the system further comprises a frequency-conversion module optically coupled to the SOI PIC, the frequency-conversion module adapted to convert an optical signal having a first frequency to an optical signal having a second frequency. Other features and example features of the system are as described above with respect to the 1$^{st}$ through the 6$^{th}$ and the 14$^{th}$ aspects of the first example embodiments.

In a 16$^{th}$ aspect of the first example embodiment, the at least one optical modulator is disposed on a substrate, and wherein each of the plurality of optical channels comprises an output waveguide. Other features and example features of the system are as described above with respect to the 1$^{st}$ through the 15$^{th}$ aspects of the first example embodiments.

In a 17$^{th}$ aspect of the first example embodiment, the plurality of output waveguides is configured to form a one-dimensional output array.

Other features and example features of the system are as described above with respect to the first through the 16$^{th}$ aspects of the first example embodiments.

In an 18$^{th}$ aspect of the first example embodiment, the system comprises a plurality of stacked optical modulators configured to form a two-dimensional output array. Other features and example features of the system are as described above with respect to the first through the 18$^{th}$ aspects of the first example embodiments.

In a 19$^{th}$ aspect of the first example embodiment, each of the plurality of output waveguides is optically coupled to an auxiliary waveguide, the auxiliary waveguides configured to form a two-dimensional output array. Other features and example features of the system are as described above with respect to the first through the 18$^{th}$ aspects of the first example embodiments.

In a 20$^{th}$ aspect of the first example embodiment, each output waveguide is optically coupled to a diffraction grating. Other features and example features of the system are as described above with respect to the first through the 19$^{th}$ aspects of the first example embodiments.

In a 21$^{st}$ aspect of the first example embodiment, the diffraction gratings are configured to form a two-dimensional output array. Other features and example features of the system are as described above with respect to the first through the 21$^{st}$ aspects of the first example embodiments.

In a 22$^{nd}$ aspect of the first example embodiment, the system further comprises a microlens array, wherein each microlens of the array is optically coupled to one of the diffraction gratings. Other features and example features of the system are as described above with respect to the first through the 21$^{st}$ aspects of the first example embodiments.

In a 23$^{rd}$ aspect of the first example embodiment, each output waveguide is configured to carry a trapping beam of a first wavelength, and wherein the substrate further includes a plurality of gate waveguides, each trapping waveguide being optically coupled to at least one of the trapped particles of the addressable array, and each gate waveguide being configured to carry a gate beam of a second wavelength, different from the first wavelength. Other features and example features of the system are as described above with respect to the first through the 22$^{nd}$ aspects of the first example embodiments. In a 24$^{th}$ aspect of the first example embodiment, at least one output waveguide and at least one gate waveguide are configured to optically couple, thereby producing a combined wavelength-multiplexed gate/trapping beam. Other features and example features of the system are as described above with respect to the first through the 23$^{rd}$ aspects of the first example embodiments.

In a second example embodiment, the present invention is a method 500 for optically modulating a plurality of optical channels. In a first aspect of the second example embodiment, the method comprises converting 510 a coherent light beam into a plurality of optical channels; delivering 520 the plurality of optical channels to at least one optical modulator, the at least one optical modulator adapted to optically modulate each of the plurality of optical channels; optically modulating 530 at least one of the plurality of optical channels; and optically coupling 540 at least one of the plurality of optical channels to at least one of a plurality of trapped particles disposed at a trapping plane of a vacuum chamber adapted to generate an addressable array of the plurality of trapped particles therein.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only, and are not intended to be limiting.

What is claimed is:

1. A system for optically modulating a plurality of optical channels, the system comprising:

a power delivery module adapted to convert a coherent light beam into a plurality of optical channels;

at least one optical modulator, optically coupled to the power delivery module, the at least one optical modulator adapted to optically modulate each of the plurality of the optical channels;

a vacuum chamber having a trapping plane therein, the vacuum chamber adapted to generate an addressable array of trapped particles at the trapping plane, wherein each of the plurality of optical channels is optically coupled to at least one of the trapped particles of the addressable array; and wherein the at least one optical modulator comprises a plurality of electro-optically controlled Mach-Zehnder Interferometers (MZI), each of the plurality of the MZIs adapted to modulate one of the optical channels.

2. The system of claim 1, further comprising a coherent light source optically coupled to the power delivery module.

3. The system of claim 1, wherein the power delivery module comprises at least one beam splitter and an optic fiber array.

4. The system of claim 3, wherein the power delivery module comprises at least one electrically controlled optical modulator adapted to modulate the at least one beam splitter.

5. The system of claim 1, wherein the at least one optical modulator is configured to modulate a signal amplitude on each of the plurality of optical channels.

6. The system of claim 1, wherein the at least one optical modulator is a photonic integrated circuit (PIC).

7. The system of claim 1, wherein each of the plurality of MZIs comprise waveguides comprising a material selected from lithium niobate, lithium tantalate, $Al_xGa_{1-x}N$, SiN, titanium dioxide ($TiO_2$), barium titanate (BTO), or alumina.

8. The system of claim 7, wherein the material is lithium niobate.

9. The system of claim 1, wherein the at least one optical modulator comprises a Silicon-on-Insulator (SOI) photonic integrated circuit (PIC), said SOI PIC adapted to optically modulate each of the plurality of the optical channels.

10. The system of claim 9, further comprising a frequency-conversion module optically coupled to the SOI PIC, the frequency-conversion module adapted to convert an optical signal having a first frequency to an optical signal having a second frequency.

11. The system of claim 1, wherein the at least one optical modulator is disposed on a substrate, and wherein each of the plurality of optical channels comprises an output waveguide.

12. The system of claim 11, wherein the plurality of output waveguides is configured to form a one-dimensional output array.

13. The system of claim 12, wherein the system comprises a plurality of stacked optical modulators configured to form a two-dimensional output array.

14. The system of claim 12, wherein each of the plurality of output waveguides is optically coupled to an auxiliary waveguide, the auxiliary waveguides configured to form a two-dimensional output array.

15. The system of claim 11, wherein each output waveguide is optically coupled to a diffraction grating.

16. The system of claim 15, wherein the diffraction gratings are configured to form a two-dimensional output array.

17. The system of claim 16, further comprising a microlens array, wherein each microlens of the array is optically coupled to one of the diffraction gratings.

18. The system of claim 11, wherein each output waveguide is configured to carry a trapping beam of a first wavelength, and wherein the substrate further includes a plurality of gate waveguides, each trapping waveguide being optically coupled to at least one of the trapped particles of the addressable array, and each gate waveguide being configured to carry a gate beam of a second wavelength, different from the first wavelength.

19. The system of claim 18, wherein at least one output waveguide and at least one gate waveguide are configured to optically couple, thereby producing a combined wavelength-multiplexed gate/trapping beam.

* * * * *